Aug. 26, 1958 W. E. SCHOCK 2,848,803
FASTENING DEVICE
Filed July 19, 1955
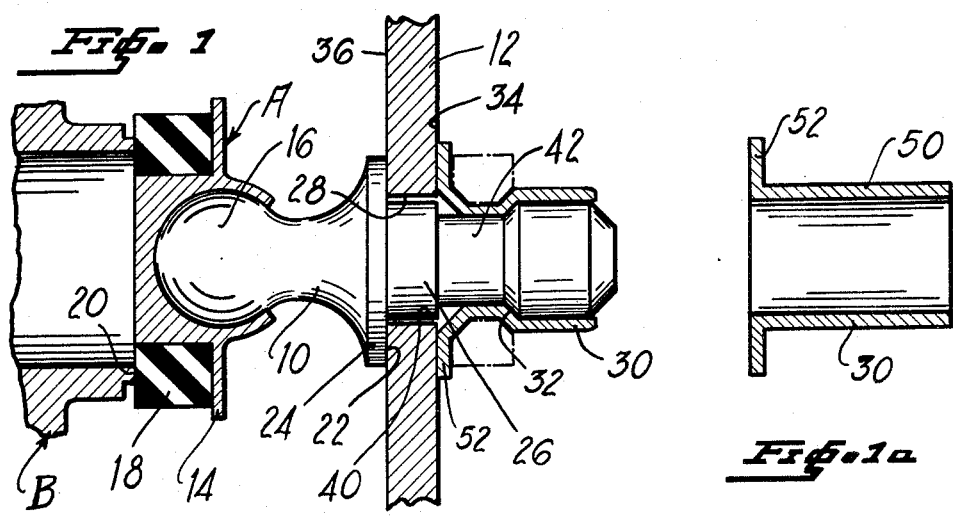
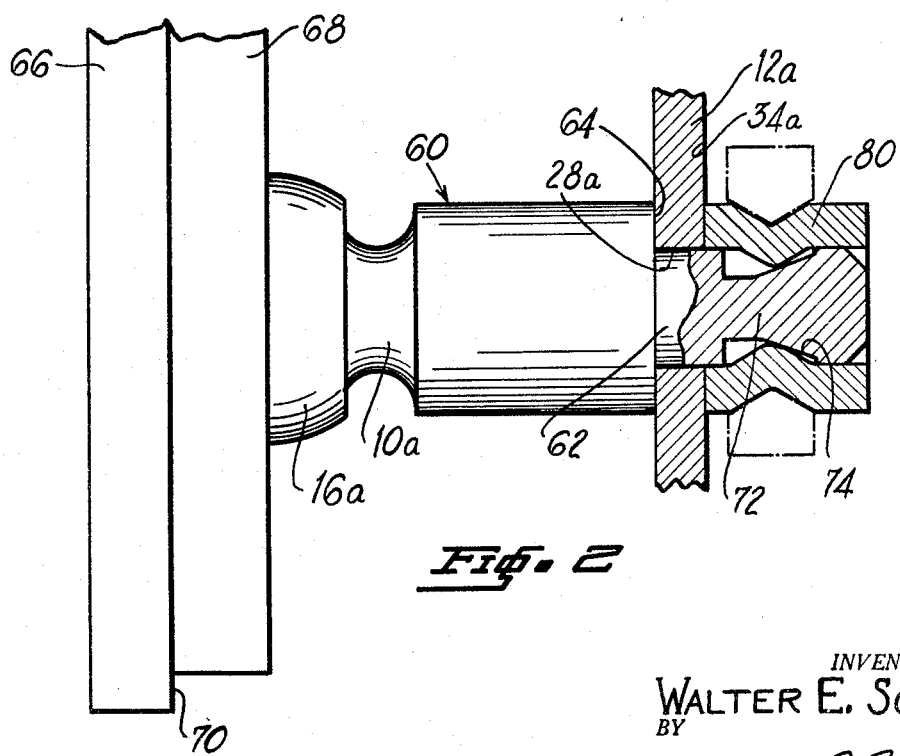
INVENTOR.
WALTER E. SCHOCK
BY
William P. Hickey
ATTORNEY

United States Patent Office 2,848,803
Patented Aug. 26, 1958

2,848,803
FASTENING DEVICE

Walter E. Schock, South Bend, Ind., assignor to Bendix Aviation Corporation, South Bend, Ind., a corporation of Delaware Application July 19, 1955, Serial No. 523,010

4 Claims. (Cl. 29—517)

The present invention relates to fastening devices; and more particularly to a new and improved method of attaching a poppet valve to a supporting structure and to poppet valve structures adapted to be attached to supporting members by said method.

In the manufacture of pneumatic powered servomotors for power braking systems and the like, the need has arisen for a poppet valve construction and/or a fastening device which can be quickly, simply, and efficiently attached to an actuating member. The structure must be simple and inexpensive to manufacture; it must be rugged and reliable in operation, such that repeated usage and vibration will not loosen its attachment to the actuating member; and the construction must be such that it can be attached to the actuating member quickly and with a minimum of effort.

An object of the present invention is the provision of a new and improved method of attaching poppet valves to supporting structures wherein a deformable member is crimped between a pair of abutment surfaces inclined with respect to each other, one abutment surface being positioned on the poppet valve and the other being positioned on its supporting structure.

Another object of the present invention is the provision of a new and improved poppet valve structure which can be attached to another member by the use of a deformable member, and which structure positions itself on the other member when the deformable member is crimped into place.

Another object of the present invention is the provision of a new and improved poppet valve which can be attached to a generally flat supporting member having a hole therethrough, the poppet valve comprising a stem adapted to be inserted through the hole and having a generally radially extending abutment surface adapted to be positioned against one side of the supporting member, and an inclined surface adapted to be positioned on the other side of the supporting member and forming an acute angle with respect to said abutment surface, whereby a deformable member crimped onto said stem between the supporting member and said inclined surface wedges the supporting member between itself and said abutment surface.

A further object of the invention is the provision of a poppet valve structure of the above described type which is secured to its supporting member by the crimping of a deformable member onto the valve stem and which structure can be easily disassembled from the supporting member by withdrawing the stem of the valve back through the deformed member and the hole in the supporting member.

A still further object is the provision of an improved fastening device which facilitates securing one member to another quickly and efficiently in a manner to permit subsequent disassembly of the members without injury thereto.

Further objects and advantages will be apparent to those skilled in the art to which the invention relates from the following description of the preferred embodiments described with reference to the attached drawing forming a part of this specification, and in which:

Figure 1 is a fragmentary view with parts in section of a first embodiment of the invention shown secured to a supporting member as by the use of a crimping tool indicated by dot-dash lines;

Figure 1a is a view showing one of the members of the first embodiment in its undeformed condition; and Figure 2 is a fragmentary view with parts in section of a second embodiment of the invention shown secured to a supporting member as by the use of a crimping tool indicated by dot-dash lines.

Referring to Figure 1 of the drawing, a stem 10 of a poppet valve A similar to those shown and described in application Serial No. 454,797 filed September 7, 1954, is shown secured to a portion of a supporting or actuating member 12 referred to as a walking beam in the above identified application. The poppet valve A, comprises a head portion 14, swivelly mounted upon a ball shaped end portion 16 of the stem 10 and includes an annular ring 18 of resilient material adapted to close off the port 20 of the valve seat structure B. The stem 10 is provided with an abutment surface 22 formed on one side of a flange 24 from which the shank portion 26 of the stem 10 projects. The shank portion 26 protrudes through a hole 28 in the actuating member 12 and is attached thereto by means of a deformable member 30 which in its deformed condition engages a surface 32 inclined with respect to the adjacent side 34 of the actuating member 12 and spaced apart from the actuating member 12 for a reason which will later be described.

The actuating member 12, to which the valve stem 10 is attached is a flat structure having generally parallel side surfaces 34 and 36, such that the surface 32 is inclined with respect to the abutment surface 34.

The stem 10 is formed in one piece, the shank portion 26 of which is adapted to be inserted into the cylindrical hole 28 so that the abutment surface 22 of the stem bears against the opposite side edge 36 of the actuating member 12. The shank portion 26 is a generally cylindrically shaped structure having a portion 40 adjacent the abutment surface 22 of a diameter just slightly less than the diameter of the hole 28 and has a reduced diameter portion 42 axially projecting from the portion 40 which terminates in an inclined surface 32. The surface 32 may be inclined with respect to side surface 34 at any convenient angle, preferably 45° and may be spaced from the surface 34 any convenient distance which will provide a suitable space between itself and the surface 34 in which a deformable member may be crimped.

The deformable member 30 shown in Figure 1 as clamping the stem 10 to the actuating member 12, when in its undeformed or uncrimped condition is an annular ring of generally L-shaped cross-section, as shown in Figure 1a, and comprises a cylindrical sleeve portion 50 and a radially extending flange portion 52. Assembly of the structure is accomplished by inserting the shank 26 of the stem 10 through the hole 28 of the actuating member; sliding the member 30 onto the shank 26 so that its radially extending flange portion 52 bears against surface 34 of the actuating member 12; and crimping or deforming the sleeve portion 50 of the member 30 in the region between the flange 52 and the inclined surface 17. The crimping tool should have sufficient width such that one side of the tool bears against the flange 52 while the other side forces the wall of the sleeve against the inclined surface 32. This crimping of the wall of the sleeve 50 upon the shank, draws the shank 26 through the hole 28 until engagement between the flange 24 and the actuating member 12 is accomplished so as to rigidly lock the entire structure in place.

A further advantage of the structure shown in Figure 1 is that disassembly can be easily accomplished by driving the shank 26 back through the hole 28, as by the use of a center punch and hammer, whereupon the inclined surface 32 wedges the deformed sleeve 30 back into a condition approaching its original shape, and forces the shank from the sleeve 30 and out of the hole 28.

A second embodiment of the invention is shown in Figure 2 in which parts of identical construction to those of Figure 1 are given the same reference number but with the subscript "a" attached and comprises a generally cylindrical stem 60 having a reduced diameter portion forming a shank 62 and an annular abutment surface 64. The shank 62 is adapted to be inserted into the hole 28a of an actuating member 12a similar to that shown in Figure 1 and carries a head portion 66 having a ring of resilient material 68 on its back or underside 70 adapted to close off a valve port (not shown) positioned between the head portion 66 and the walking beam 12a. The shank 62 in turn is provided with a reduced diameter portion 72, the inside or bottom surface 74 of which forms an incline or taper with the side surfaces 34a and 36a of the actuating member 12a and so in turn with the abutment surface 74. Deforming of the sleeve or tubular member 80, by a properly shaped tool positioned against the actuating member 12a pulls the shank 62 into position with its abutment surface 64 engaging the actuating member 12a and at the same time locks the structure in place.

While the preferred embodiments of the invention have been described and shown as attaching the generally cylindrically shaped stem of a poppet valve to an actuating member, it is not so limited. The invention may be utilized to fasten stems of structures other than valves to members other than actuating members and may be used in conjunction with stems of other than circular cross-section. The invention may further be used to attach two pieces of material together by means of a third member embodying the principles of the present invention as is done by a conventional fastener.

While the preferred embodiments of the invention have been described in considerable detail, I do not wish to be limited to the particular constructions shown which may be varied within the scope of the invention and it is the intention to cover hereby all adaptations, modifications and arrangements thereof which come within the practice of those skilled in the art to which the invention relates.

I claim:

1. The method of attaching a poppet valve to a support member of predetermined thickness and having a hole therethrough comprising forming a first abutment surface on said poppet valve adapted to abut one side of said support member; forming a second abutment surface on said poppet valve spaced from said first abutment surface a distance greater than the predetermined thickness of said support member and inclined with respect to the other side of said support member, said second abutment surface being adapted to be inserted through said hole in said support member; inserting the portion of said poppet valve having said second abutment surface through the hole in said support member; placing a deformable sleeve member having a non-interference fit with respect to said poppet valve onto said poppet valve in the region between the other side of said support member and said second abutment surface; and forcing a crimping tool radially inwardly against said deformable sleeve to wedge the deformable sleeve between the other side of said support member and said second abutment surface in a manner tightening the poppet valve to the support member without the aid of a backup force.

2. The method of attaching a first member having an enlarged headed portion from which a smaller stem portion projects to a support member of predetermined thickness and having a hole therethrough, comprising forming a reduced diameter section in said stem portion spaced from said headed portion a distance corresponding generally to the thickness of said support member, the edge of said reduced diameter section spaced farthest away from said headed portion being inclined with respect to said headed portion, inserting the stem of said first member through said hole in said support member with its headed portion in abutment with one side of the support member, placing a deformable sleeve having a non-interference fit with respect to the stem around said stem and in abutment with the other side of the support member, and forcing a crimping tool radially inwardly against said sleeve to deform said sleeve into said reduced diameter section and wedging said deformable sleeve between the other side of said support member and said inclined edge of said reduced diameter section in a manner tightening said first member to the support member without the aid of an axially applied backup force.

3. The method of attaching a poppet valve member and the like having an axially extending stem portion from which a radially extending flange projects to form an abutment shoulder to a support structure of generally predetermined thickness and having a hole therethrough, comprising: forming a reduced diameter section in said stem portion spaced from said flange a distance corresponding generally to the thickness of said support member, the edge of said reduced diameter section spaced farthest away from said abutment shoulder being inclined radially outwardly and away from said flange, inserting the stem of said first member through said hole in said support structure with its abutment shoulder against said support structure, placing a flanged deformable sleeve over said stem with its flange against said support structure, placing a crimping tool against the side of the flange of said deformable sleeve, and thereafter forcing the crimping tool radially inwardly to wedge the tool between said flange of said sleeve and a portion of said sleeve that is deformed over said inclined edge of said reduced diameter section by the inward movement of said crimping tool.

4. The method of attaching a poppet valve member and the like having an axially extending stem portion from which a radially extending flange projects to form an abutment shoulder to a support structure of generally predetermined thickness and having a hole therethrough, comprising: forming a reduced diameter section in said stem portion spaced from said flange a distance corresponding generally to the thickness of said support member, the edge of said reduced diameter section spaced farthest away from said abutment shoulder being inclined radially outwardly and away from said flange, inserting the stem of said first member through said hole in said support structure with its abutment shoulder against said support structure, placing a deformable sleeve over said stem with one of its ends against said support structure, placing a crimping tool having beveled side edges against the side of said deformable sleeve, and thereafter forcing the crimping tool radially inwardly to deform said sleeve into the recess formed by said reduced diameter section and at the same time force some of its material in an endwise direction against said inclined edge while forcing other material in the opposite direction against said support structure.

References Cited in the file of this patent

UNITED STATES PATENTS

| | | |
|---|---|---|
| 959,341 | Heeter | May 24, 1910 |
| 970,669 | Vallone | Sept. 20, 1910 |
| 1,133,874 | Mirtz | Mar. 30, 1915 |
| 1,765,651 | Bryant | June 24, 1930 |
| 2,222,609 | Everett | Nov. 26, 1940 |
| 2,355,579 | Wing | Aug. 8, 1944 |
| 2,395,667 | Keller | Feb. 26, 1946 |
| 2,542,376 | Torresen | Feb. 20, 1951 |

FOREIGN PATENTS

| | | |
|---|---|---|
| 525,020 | Great Britain | Aug. 20, 1940 |